Feb. 21, 1956    D. N. KERVEN    2,735,464
AUTOMATIC EVACUATOR FOR REMOVING THE EGGMEAT CONTENTS OF EGGS
Filed Jan. 25, 1955    3 Sheets-Sheet 1
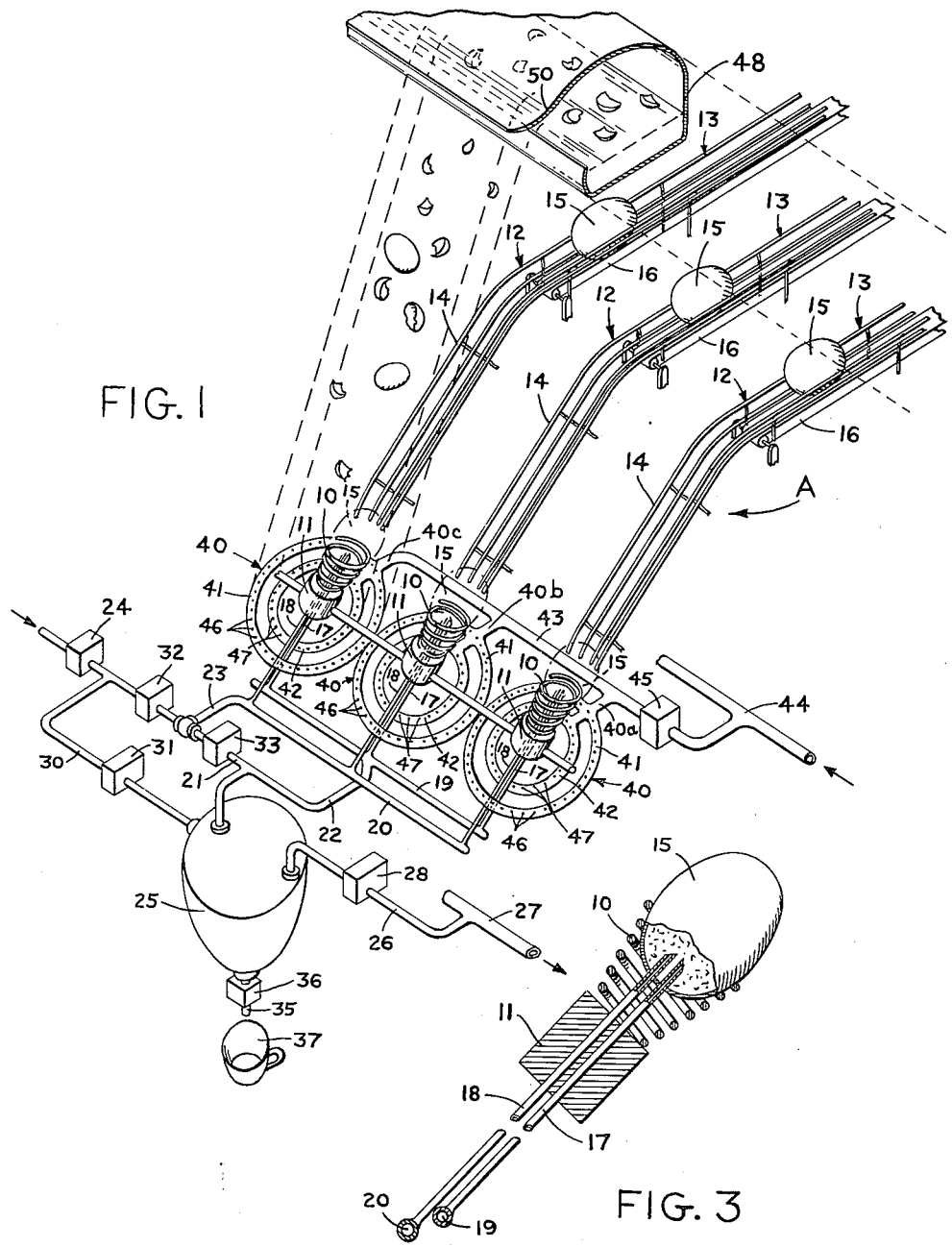
DANYAL N. KERVEN
*INVENTOR.*
BY Daniel A. Bobri
*Atty*

Feb. 21, 1956     D. N. KERVEN     2,735,464
AUTOMATIC EVACUATOR FOR REMOVING THE EGGMEAT CONTENTS OF EGGS
Filed Jan. 25, 1955     3 Sheets-Sheet 2
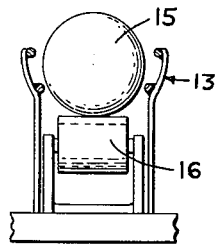
FIG. 4
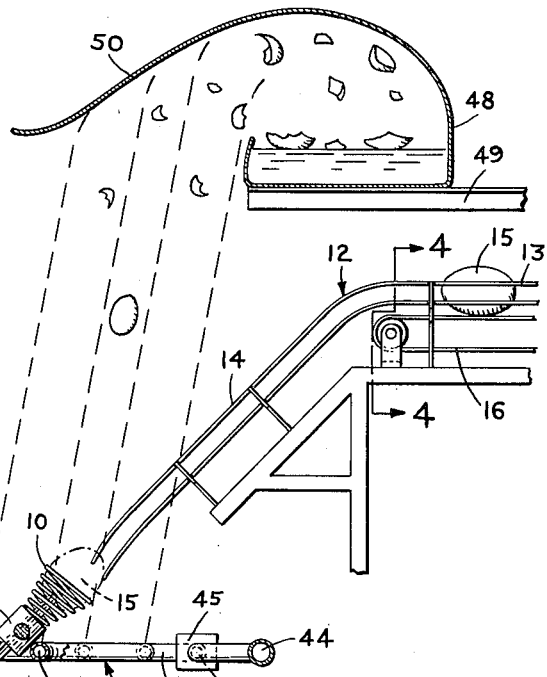
FIG. 2
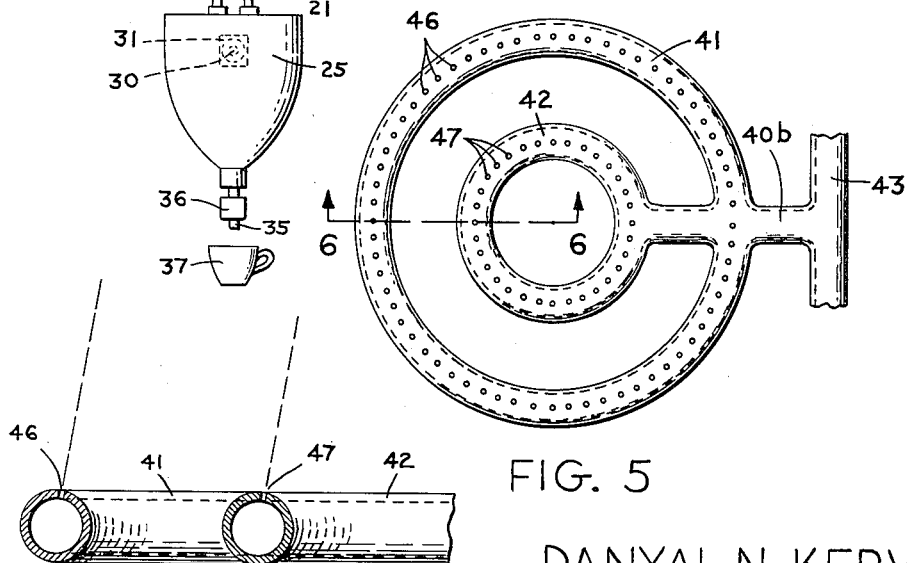
FIG. 5
FIG. 6
DANYAL N. KERVEN
INVENTOR.
BY Daniel H. Bolio
atty Feb. 21, 1956 — D. N. KERVEN — 2,735,464
AUTOMATIC EVACUATOR FOR REMOVING THE EGGMEAT CONTENTS OF EGGS
Filed Jan. 25, 1955 — 3 Sheets-Sheet 3
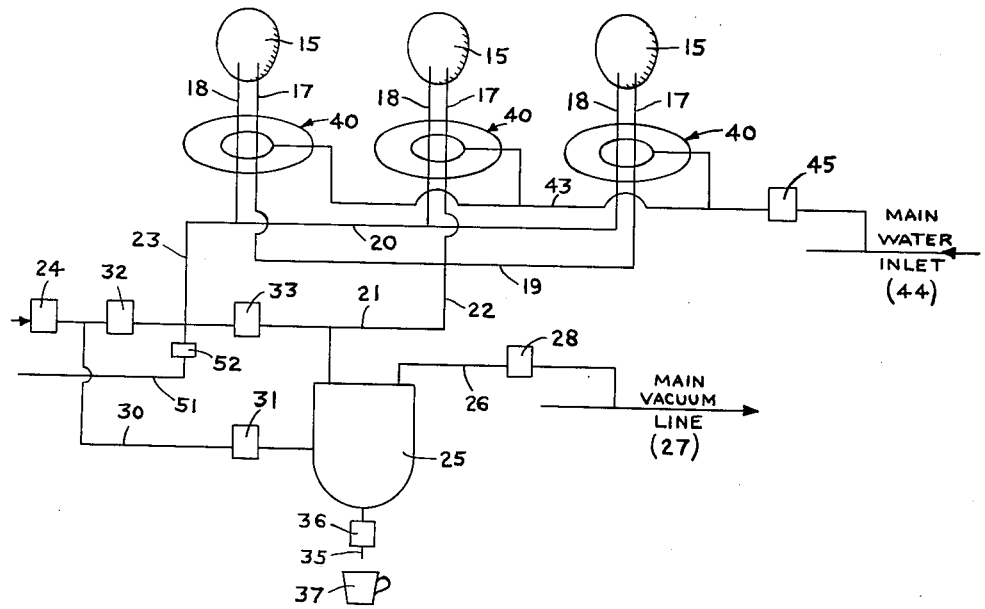
FIG. 7
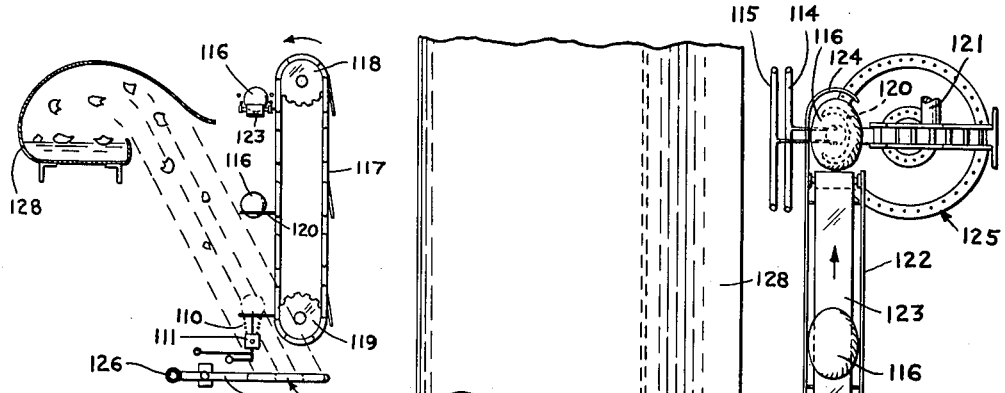
FIG. 8
FIG. 9
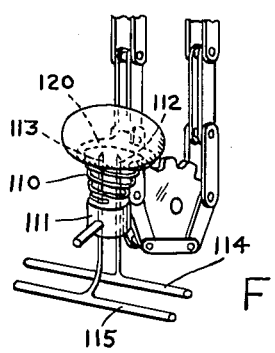
FIG. 10
DANYAL N. KERVEN
INVENTOR.
BY Daniel N. Bobis
atty United States Patent Office 2,735,464
Patented Feb. 21, 1956

2,735,464

AUTOMATIC EVACUATOR FOR REMOVING THE EGGMEAT CONTENTS OF EGGS

Danyal N. Kerven, Newark, N. J.

Application January 25, 1955, Serial No. 483,879

12 Claims. (Cl. 146—2)

This invention relates generally to means for separating the eggmeat content from the shell portion of an egg and more particularly to an automatically operated pressure-suction evacuator for removing the eggmeat contents of an egg and hydraulic means for disposing of the empty eggshells after the removal of the egg content.

There have been proposed heretofore various apparatus and methods for the removal of the contents of an egg by use of suction. In connection with such apparatus and methods one of the problems thereof is the necessity of complying with certain health regulations which require a smell test, on a maximum of no more than three eggs at one time, for the purpose of segregating the good eggs from the bad eggs, one of the concomitant difficulties of this health requirement being the necessity of clearing out the piping, the receiver, the suction evacuating means, etc., which have come into contact with a bag egg.

It has also been known heretofore that a vacuum or suction applied through a hollow needle, over which the eggs can be placed or dropped with sufficient force to be pierced by the needle, can be utilized for withdrawing the eggmeat contents from the eggs, a suitable receiver or tank being provided for storing the eggmeat, and the empty shells being removed by hand or other mechanical means.

The present invention meets this problem by providing an apparatus and method for the automatic evacuation of the eggmeat contents of eggs wherein a plurality of paired hollow needle sets formed into suitable groups, as for example, groups of three are connected in a piping system so that pressure air and suction can be applied thereto, when eggs are dropped onto the needles and pierced thereby, to enable the eggmeat contents of the eggs to be removed and lead to a suitable reservoir or tank connected to said needles, a valve being provided in the outlet of the receiver to withdraw such eggmeat contents on each cycle for testing in accordance with the prescribed health rules, and the pressure air in the system further adapted not only to assist in the evacuation of the eggmeat content of the eggs but to maintain at least one of the needle pairs in each set open at all times to provide an alternate path of egg evacuation in the event the initial path for evacuation becomes clogged and to assist in aiding to clean out the piping system.

The present invention further contemplates the automatic operation of this pressure-suction apparatus by a series of regulated steps including delivery of the egg, evacuation thereof in conjunction with pressure air delivery to maintain at least one needle clear, auxiliary evacuation, the cleaning of all lines and connecting apparatus, and the disposal of the eggs by a suitable non-mechanical fluid operated disposal means provided for this purpose.

With this and other objects in view, the invention will be described with reference to the accompanying drawings in which:

Figure 1 is an isometric diagramamtic projection of the invention.

Figure 2 is an enlarged side elevation of one of the egg receivers diagrammatically illustrated in Figure 1.

Figure 3 is a cross section showing one pair of hollow needles.

Figure 4 is a cross section showing the guide rails and the conveying belt.

Figure 5 is an enlarged top view of the water jet ring.

Figure 6 is an enlarged view taken on 6—6 of Figure 5.

Figure 7 is a diagrammatic sketch showing a modified form of the invention.

Figure 8 is a diagrammatic sketch of another form of the present invention.

Figure 9 is an enlarged top view of the diagrammatic sketch shown in Figure 8.

Figure 10 is an enlarged view of the conveyor arrangement of the form of the invention shown in Figure 8.

Referring to the drawings, Figure 1 shows diagrammatically a single unit generally designated "A," it being understood that while only one group is shown and described that this is illustrative only and that any number of units may be utilized without departing from the spirit of the present invention.

Accordingly, group "A" is shown comprising three spaced resilient egg receivers 10 mounted on their respective supporting members 11 and so disposed that guiding rails generally designated 12 comprising horizontal sections 13 and downwardly sloping sections 14 will convey and deposit egg members 15 onto the egg receivers 10 where they will be seated with the longitudinal axis in substantial alignment with the axis of the receiver, the egg being conveyed along the horizontal portion 13 by the conveying belt 16 and slid or rolled down the sloping section 14 with sufficient force to enable a set of paired hollow needles 17 and 18 extending through each of the support members 11 to pierce one end of the egg deposited upon its respective egg receiver in the approximate longitudinal axis thereof, all of which is clearly shown in Figures 1, 2 and 3 of the drawings.

It will be understood that while three (3) egg receivers are shown in the present group A that this is illustrative only and that the limitation to three (3) pairs of needles coacting with three (3) receivers is dictated by the health rules which limit the group testing of eggs to a maximum of three (3) at any one time. If, however, the health rules are relaxed to allow four, five or more eggs to be tested at one time, as an obvious expedient the number of paired needle sets and egg receivers may be increased without departing from the spirit of the present invention or otherwise varying its operation as will be hereinafter described.

Figure 2 shows that each of the egg receivers 10 comprise a resilient element wider at the upper than the lower end to form a hollow inverted isosceles trapezoid in cross-section, while the needle members 17 and 18 are depicted as elongated hollow elements which extend through the receiver supports 11 into the medial section of the resilient egg receivers 10 where the upper pointed ends will be so disposed that the egg members 15 will be pierced thereby as they wedgingly seat themselves in their respective receivers when delivered from any suitable point of storage (not shown) by the conveying belt 16 and guiding rails 12. The eggs can be delivered at any suitable speed in accordance with the hereinafter described cycle of operations.

PRESSURE SUCTION SYSTEM

In order to extract the eggmeat content of the eggs so delivered to each set of paired needles, a piping system is provided to which the lower end of the hollow needles 17 and 18 are connected in any suitable manner, such piping systems to be made of any suitable materials such as plastic, rubber, glass, etc. adapted for this type system.

Thus, the lower end of each of the hollow needles 17 is connected to a common vacuum or suction line 19 and that of each of the hollow needles 18 are connected to a common pressure air conduit 20. The pressure air conduit 20 and the vacuum or suction line 19 are in turn tied to a main conduit 21 through their respective connecting conduits 22 and 23.

One end of the main flow conduit 21 is connected through a pressure air regulator 24 to a source of pressure air, not shown, while the other end is connected to a tank or reservoir 25 in turn connected through connecting conduit 26 to a common suction line 27 connected to suction applying means, such as a vacuum pump or the like (not shown), a valve 28 being provided in line 26 to control the application of suction to the system.

An auxiliary pressure conduit 30 connects the main line 21 and the tank or reservoir 25. The auxiliary pressure conduit is connected at a point beyond the point remote with respect to the point where the connecting conduit 23 is connected to the main line 21, a valve 31 being provided to control the flow of pressure air therethrough.

Between the points where the auxiliary conduit 30 and the connecting conduit 23 connect to the main line 21 a first valve 32 is provided. A second valve 33 is provided between the point where the connecting conduit 23 and the reservoir 25 are connected to the main flow conduit 21.

By opening and closing the valves 28, 31, 32, and 33 as hereinafter described the application of pressure air and suction to the respective hollow needle sets can be controlled as desired.

While the valves are not shown they may be any suitable type of solenoid operated valves which type valves are easily purchasable on the open market, are well known in the art of flow control, and, hence, not more fully described herein.

The reservoir or tank 25 is further provided with an outlet 35 also having any suitable type of normally closed solenoid valve 36 thereacross which can be opened to discharge the contents of the reservoir or tank 25 into the testing container 37 where the operator can make the proper smelling test in accordance with the health regulations relative to egg breaking apparatus.

DISPOSAL APPARATUS

In order to dispose of the eggshells after the eggmeat content of the eggs has been removed a series of jet rings each generally designated 40 are provided about each of the egg receivers 10. Each of the jet rings 40 comprises an outer annular member 41 and an inner annular member of a lesser diameter than the outer annular member 42, which are connected to each other and to a water supply conduit 43 by suitable connecting conduits 40a, 40b and 40c. The water supply conduit 43 is in turn connected to the common pressure water line 44, a valve 45 being provided in the water lead-in line to control the flow therethrough, all of which is clearly shown in Figures 1, 2 and 5 of the drawings.

Figures 4 and 5 further show that each of the annular rings 41 and 42 are hollow cylindrical members having spaced circumferentially disposed openings 46 and 47 respectively on the upper periphery thereof so that when water under pressure from any suitable source (not shown) is supplied through the common pressure water line 44, water lead-in line 43 and connecting lines 40a, 40b and 40c to the respective annular members 41 and 42, it will be sprayed upwardly as indicated in Figures 2 and 6 of the drawings.

The ring members will be at a suitable angle to allow water sprayed from said openings 46 to act on the eggshells and throw or pass them upwardly into an overhanging trough 48 which is supported on a trough support 49, the trough catching the water and empty eggshells and conveying them to any suitable point for disposal. The spray issuing from the inner and outer rings 42 and 41 respectively, is so disposed that that from the inner rings acts directly to force the empty eggshells upwardly while that from the outer ring acts as a screen to prevent the empty eggshells from escaping. The diameter of the inner ring 42 will be such that the eggs will not fall inwardly as they are passed upwardly into the trough 48.

The trough is provided with an outwardly extending curved baffle or stop member 50 which extends over the top thereof so that eggshells which are thrown upwardly toward the trough will be deposited therein by ricocheting off the baffle or stop member 50.

OPERATION CYCLE

1. *Evacuation step*

When the operation is started, all valves are normally closed. However, through any suitable time operating signalling control (not shown) the solenoid operated valves 31, 32, 33, 28, 36 and 45 may be opened as desired, the initial signal of the cycle opening only two valves, the valves 32 and 28. The pressure regulator 24 on the opening of these two valves will simultaneously be set at the low pressure setting for this step. This low pressure air setting is empirically determined within the limits of the eggshell strength itself and functions not as a force but rather as a means to keep positive air pressure in the needles 18 and to replace with air the contents of the egg removed by application of suction to needles 17 as hereinafter described.

During operation, pressure air and suction will be continuously available to the system and in the initial setting of the valves, namely, where valve 32 and valve 28 are open the pressure air acts through the connecting conduit 23, common conduit 20 and all the hollow needles 18 of the paired needle sets. Simultaneously, suction is being continuously applied through lines 27, 26, the receiver 25, line 22 and common conduit 19 to each of the hollow needles 17.

By the combination of pressure air and suction applied through the needles 17 and 18 the eggmeat contents of the eggs are drawn through their respective hollow needles 17 and connecting conduits 19 and 22 to the receiver 25.

2. *Auxiliary evacuation*

After a predetermined period of time the signalling device (not shown) signals valve 32 closed and valve 33 to open. This effects the application of suction through both hollow needles 17 and 18 and if by chance one of the needles 17 become plugged or clogged for any reason then its paired needle 18 which has been maintained open by pressure air will operate to evacuate the eggmeat contents of the respective egg of that paired needle set.

3. *Cleaning and egg disposal*

After the auxiliary or safety evacuation has continued a predetermined period, the signalling means signals valves 32 and 28 closed, and valves 31 and 45 open and simultaneously the pressure regulator 24 is signalled to a high pressure setting. This allows pressure air to be applied through the reservoir 25 to the main flow lines 21 connecting conduits 22 and 23, common pressure and vacuum lines 19 and 20, and the hollow needles 17 and 18 of each paired needle set respectively connected thereto. The pressure air not only cleans this piping and the connected elements but acts along with the pressure water delivered to the jet rings 40 as above described to project the empty eggshells upwardly into the trough 48.

4. *Testing step*

The cleaning and disposal step also continues for a predetermined time and then all open valves are signalled closed and valve 36 in the outlet line 35 of the reservoir 25 and valve 31 is signalled open. Since the needles 17 are open to atmosphere and reservoir 25 is filled with compressed air, the eggmeat contents in the reservoir will drain through the outlet 35 into the container 37 where the operator can remove the container and make the required smell test. If the eggmeat contents pass the smell test, it is delivered by the operator to any suitable point of storage (not shown) until it is to be used. The closing of valve 36 signals the beginning of the operation cycle above described once again.

If the eggs do not pass the smell test then the operator stops the normal operation cycle and signals open valves 31, 33 and 36 to allow high pressure air to blow the system clean for reuse once again.

In the form of the invention shown in Figure 7, the system is substantially identical with that shown in Figures 1 and 2 of the drawings; hence, only the pressure air-suction conduit system and the hydraulic disposal systems are illustrated, like character numerals representing like parts of the system above described in Figures 1 and 2 of the drawings.

The system shown in Figure 7 adds to the basic system above described a cleaning fluid conduit 51 which is connected to the main flow conduit 21 at a point between the valves 32 and 33. The cleaning fluid can be any suitable type such as that set forth in paragraph 55.223 of the U. S. Dept. of Agriculture Sanitation Regulations, which specifies any approved bactericidal solution carrying a minimum original strength of 200 p. p. m. of available chlorine or equivalent, the solution to be changed when the concentration of chlorine or equivalent in the solution drops to 100 p. p. m. A cleaning fluid control valve 52 is provided to control the flow of this cleaning fluid from any suitable source (not shown).

In operation, the valve 52 is normally closed at all times and will generally be manually controlled to open the same. When it is desired to clean the system, valves 28, 31, 32, 36 and 45 are closed and valves 33 and 52 are opened. This allows cleaning fluid to pass through all parts of the pressure suction conduit system and the reservoir, which parts come in contact with the eggmeat content of the egg. After a predetermined time valve 52 is closed and valves 31 and 36 are opened to drain out the residual cleaning fluid remaining in the pressure-suction system and to blow the lines clear to prepare the system once again for the operating cycle above described in connection with Figure 1 of the drawings. When all the valves are placed in a closed position once again the system is ready for this regular operation cycle.

VERTICAL CONVEYOR ARRANGEMENT

In Figures 8, 9 and 10 of the drawings, a modified form of conveying the eggs to the egg receiver, only one member will be shown for the purposes of illustrating the present form of the invention, it being understood that each group of egg receivers could be increased to a maximum of three egg receivers similar to the form of the invention shown in Figures 1 and 2 of the drawings.

Thus, egg receiving members 110 are mounted on suitable egg supports 111 and a set of paired needles 112 and 113 extend up through the support to a suitable point just short of the upper end of the egg receiving members 110. The position of the paired needles 112 and 113 is clearly shown in Figure 10 of the drawings.

Needle 112 is connected to a common vacuum line 114 and needle 113 is connected to a common pressure line 115, the remaining portions of the pressure vacuum piping system being identical with that above described for the form of the invention shown in Figures 1 and 2 of the drawings and, hence, not more fully described with reference to the present modification of the invention.

In order to deliver the eggs 116 to the egg receiving members 110 a continuous chain 117 is mounted about spaced gears 118 and 119, the gear element 119 being disposed adjacent the egg receiving members 110 so that egg carriers 120 disposed at spaced intervals on the continuous chain 117 will be in position when the chain is rotated through the driven shaft 121 connected to the gear 118 to deposit the egg members 116 on the paired needles 112 and 113 extending up through the egg receiving member 110, all of which is clearly shown in Figures 8 and 10 of the drawings.

The eggs are delivered to the egg carriers 120 by a guide rail 122 and conveying belt 123 which conveys the eggs 116 therealong until the eggs meet a stop member 124. The movement of the conveying belt 123 and of the egg carriers 120 on the continuously moving chain 117 is so regulated that the egg is delivered against the stop after the egg carrier 120 has passed this point so that the egg is deposited thereon and can be dropped downwardly by further movement of the continuous chain on the egg-receiving member 110 where it is pierced by the hollow needles 112 and 113 as in the case of the form of the invention shown in Figures 1 and 2 of the drawings.

Figures 9 and 10 further show that the egg carrier elements 120 are U-shaped members sufficiently wide to pass about the egg-receiving member 110 after the eggs are deposited thereon.

The egg disposal apparatus is, of course, substantially identical with that above described for the form of the invention shown in Figures 1 and 2 of the drawings; hence, only the jet ring generally designated 125 is shown. When water is delivered from the common water supply line 126 through the connecting conduit 127 the egg will be delivered to a suitable trough 128 by operation of the pressure air and water pressure as above described in the operating cycle of the structure shown in Figures 1 and 2 of the drawings.

The operation cycle of this form of the invention is identical with that above described for the structure in Figures 1 and 2 of the drawings, the only difference is that the eggs are conveyed through the medium of the conveying belt and guide rails for the horizontal movement thereof and the continuous chain 117 for the vertical movement thereof. The advantage of the conveying means shown in this form of the invention over that of the form of the invention shown in Figures 1 and 2 of the drawings is in its ability to deliver the eggs to be pierced so that its longitudinal axis is perpendicular to the longitudinal axis of the piercing needles. This allows a greater space between the two needles in the paired hollow needle sets.

It will be understood that the invention is not to be limited to the specific construction or arrangement of parts shown, but that they may be widely modified within the invention defined by the claims.

What is claimed is:

1. In an automatic egg evacuator for removing the contents of eggs, spaced resilient egg receivers, conveying means for delivering eggs to each of said receivers in predetermined spaced intervals, and a pressure suction evacuating means for removing the contents of said eggs delivered to said receivers including, paired hollow needle sets for each of said receivers having their upper ends disposed in relation to the receiving ends of said egg receivers to pierce eggs conveyed thereto, a reservoir, a conduit system connecting said paired hollow needle sets to said reservoir to pass the egg content removed by said hollow needles to said reservoir, a source of suction and a source of pressure air communicating with said hollow needles, valve means responsive to automatic signals for controlling the application of suction and pressure through said pressure suction evacuating means in a predetermined operation cycle whereby at least one alternate path of egg evacuation through said hollow needles will be provided.

2. In an automatic egg evacuator for removing the contents of eggs, spaced resilient egg receivers, conveying means for delivering eggs to each of said receivers in predetermined spaced intervals, and a pressure suction evacuating means for removing the contents of said eggs delivered to said receivers including, paired hollow needle sets for each of said receivers having their upper ends disposed in relation to the receiving end of said egg receivers to pierce eggs conveyed thereto, a reservoir, a conduit system connecting said paired hollow needle sets to said reservoir to pass the egg content removed by said hollow needles to said reservoir, a source of suction and a source of pressure air communicating with said hollow needles, valve means responsive to automatic signals for controlling the application of suction and pressure through said pressure suction evacuating means in a predetermined operation cycle whereby at least one alternate path of egg evacuation through said hollow needles will be provided, and outlet means for said reservoir controlled by an outlet valve adapted to coact with said valve means for passing egg content therefrom to a point for testing during each operation cycle.

3. In an automatic egg evacuator for removing the contents of eggs, spaced resilient egg receivers, conveying means for delivering eggs to each of said receivers in predetermined spaced intervals, and a pressure suction evacuating means for removing the contents of said eggs delivered to said receivers including, paired hollow needle sets for each of said receivers having their upper ends disposed in relation to the receiving end of said egg receivers to pierce eggs conveyed thereto, a reservoir, a conduit system connecting said paired hollow needle sets to said reservoir to pass the egg content removed by said hollow needles to said reservoir, a source of suction and a source of pressure air communicating with said hollow needles, valve means responsive to automatic signals for controlling the application of suction and pressure through said pressure suction evacuating means in a predetermined operation cycle whereby at least one alternate path of egg evacuation through said hollow needles will be provided, and fluid pressure means about each of said receivers to remove empty eggshells therefrom and to pass them to a point of waste disposal.

4. In an automatic egg evacuator for removing the contents of eggs, spaced resilient egg receivers, conveying means for delivering eggs to each of said receivers in predetermined spaced intervals, and a pressure suction evacuating means for removing the contents of said eggs delivered to said receivers including, paired hollow needle sets for each of said receivers having their upper ends disposed in relation to the receiving end of said egg receivers to pierce eggs conveyed thereto, a reservoir, a conduit system connecting said paired hollow needle sets to said reservoir to pass the egg content removed by said hollow needles to said reservoir, a source of suction and a source of pressure air communicating with said hollow needles, an auxiliary conduit connected between said pressure source and said reservoir, and valve means responsive to automatic signals for controlling the application of suction and pressure to said pressure suction evacuating means in a predetermined operating cycle and to pass pressure air to said receiver for cleaning said pressure suction evacuation means.

5. In an automatic egg evacuator for removing the contents of eggs, spaced resilient egg receivers, conveying means for delivering an egg to each of said receivers, paired hollow needle sets for each of said receivers having their upper ends disposed in relation to the receiving ends of each of said egg receivers to pass eggs conveyed thereto and for removing the contents of said eggs, a jet ring about each of said egg receivers, a disposal trough spaced from said ring, and means to supply fluid under pressure to said jet ring for hydraulically passing empty eggshells to said disposal trough.

6. In an automatic egg evacuator for removing the contents of eggs, spaced resilient egg receivers, conveying means for delivering eggs to each of said receivers in predetermined spaced intervals, and a pressure suction evacuating means for removing the contents of said eggs delivered to said receivers including, paired hollow needle sets for each of said receivers having their upper ends disposed in relation to the receiving ends of said egg receivers to pierce eggs conveyed thereto, a reservoir, a conduit system connecting said paired hollow needle sets to said reservoir to pass the egg content removed by said hollow needles to said reservoir, a source of suction and a source of pressure air communicating with said hollow needles, valve means responsive to automatic signals for controlling the application of suction and pressure through said pressure suction evacuating means in a predetermined operation cycle whereby at least one alternate path of egg evacuation through said hollow needles will be provided, a jet ring about each of said egg receivers, a disposal trough spaced from said ring, and means to supply fluid under pressure to said jet ring for hydraulically passing empty eggshells to said disposal trough.

7. In an automatic egg evacuator for removing the contents of eggs, spaced resilient egg receivers, conveying means for delivering eggs to each of said receivers in predetermined spaced intervals, and a pressure suction evacuating means for removing the contents of said eggs delivered to said receivers including, paired hollow needle sets for each of said receivers having their upper ends disposed in relation to the receiving end of said egg receivers to pierce eggs conveyed thereto, a reservoir, a conduit system connecting said paired hollow needle sets to said reservoir to pass the egg content removed by said hollow needles to said reservoir, a source of suction and a source of pressure air communicating with said hollow needles, valve means responsive to automatic signals for controlling the application of suction and pressure through said pressure suction evacuating means in a predetermined operation cycle whereby at least one alternate path of egg evacuation through said hollow needles will be provided, a cleaning fluid conduit connected to said pressure suction evacuation system at one end and to a source of cleaning fluid at the other end thereof, a cleaning fluid control valve in said cleaning fluid conduit to control the flow of cleaning fluid to said pressure suction evacuation system, said cleaning fluid control valve to be operated when said valve means responsive to automatic signals is rendered ineffective.

8. In an automatic egg evacuator for removing the contents of eggs, spaced resilient egg receivers, conveying means for delivering eggs to each of said receivers in predetermined spaced intervals, and a pressure suction evacuating means for removing the contents of said eggs delivered to said receivers including, paired hollow needle sets for each of said receivers having their upper ends disposed in relation to the receiving end of said egg receivers to pierce eggs conveyed thereto, a reservoir, a conduit system connecting said paired hollow needle sets to said reservoir to pass the egg content removed by said hollow needles to said reservoir, a source of suction and a source of pressure air communicating with said hollow needles, an auxiliary conduit connected between said pressure source and said reservoir, and valve means responsive to automatic signals for controlling the application of suction and pressure to said pressure suction evacuating means in a predetermined operating cycle and to pass pressure air to said receiver for cleaning said pressure suction evacuation means, a jet ring about each of said egg receivers, a disposal trough spaced from said ring, and means to supply fluid under pressure to said jet ring for hydraulically passing empty eggshells to said disposal trough.

9. In an automatic egg evacuator for removing the contents of eggs, spaced resilient egg receivers, conveying means for delivering eggs to each of said receivers in predetermined spaced intervals, and a pressure suction evacuating means for removing the contents of said eggs delivered to said receivers including, paired hollow needle sets for each of said receivers having their upper ends disposed in relation to the receiving end of said egg receivers to pierce eggs conveyed thereto, a reservoir, a conduit system connecting said paired hollow needle sets to said reservoir to pass the egg content removed by said hollow needles to said reservoir, a source of suction and a source of pressure air communicating with said hollow needles, an auxiliary conduit connected between said pressure source and said reservoir, and valve means responsive to automatic signals for controlling the application of suction and pressure to said pressure suction evacuating means in a predetermined operating cycle and to pass pressure air to said receiver for cleaning said pressure suction evacuation means, a jet ring about each of said egg receivers, a disposal trough spaced from said ring, and means to supply fluid under pressure to said jet ring for hydraulically passing empty eggshells to said disposal trough, and means connected to said pressure suction evacuation means to supply cleaning fluid thereto when said valve means responsive to automatic signals is rendered inoperative.

10. In an automatic egg evacuator for removing the contents of eggs, spaced resilient egg receivers, conveying means for delivering eggs to each of said receivers in predetermined spaced intervals, and a pressure suction evacuating means for removing the contents of said eggs delivered to said receivers including, paired hollow needle sets for each of said receivers having their upper ends disposed in relation to the receiving ends of said egg receivers to pierce eggs conveyed thereto, a reservoir, a conduit system connecting said paired hollow needle sets to said reservoir to pass the egg content removed by said hollow needles to said reservoir, a source of suction connected to said reservoir, a source of pressure air connected to said conduit system adapted to be regulated to a high and a low position, a first valve in said conduit system to control the application of suction to said paired hollow needle sets, a second valve to control the flow of pressure air to said paired hollow needle sets, said first valve and said second valve adapted to be opened and closed in a predetermined operating cycle to apply pressure air to one of said needles of said paired needle sets when the other needle is evacuating the contents of eggs supplied to said egg receivers, and means about said egg receivers for hydraulically passing said eggs to a point of disposal.

11. In an automatic egg evacuator as claimed in claim 10 wherein said hydraulic means for disposing of said eggs includes, a jet ring about each of said egg receivers having an inner hollow annular member and an outer hollow annular member connected to each other, said inner and outer annular members having circumferentially spaced orifices on the surface thereof adjacent the egg receivers, a waste disposal trough, and means connected to said jet rings to supply fluid under pressure thereto for discharge through said orifices whereby empty eggshells will be passed upwardly to said waste disposal trough.

12. In an automatic egg evacuator as claimed in claim 1 wherein said egg conveyor includes spaced egg carriers each disposed to deliver an egg to its respective egg receiver whereby the longitudinal axis of the egg will be substantially perpendicular to the longitudinal axis of said paired hollow needle sets.

No references cited.